US009800897B2

(12) United States Patent
Hagemeier et al.

(10) Patent No.: US 9,800,897 B2
(45) Date of Patent: Oct. 24, 2017

(54) METHOD AND DEVICE FOR FORMING A COMMON DATASTREAM ACCORDING TO THE ATSC STANDARD

(75) Inventors: Denis Hagemeier, Berlin (DE); Torsten Goerig, Berlin (DE)

(73) Assignee: Rohde & Schwarz GMBH & CO. KG, Munich (DE)

( * ) Notice: Subject to any disclaimer, the term of this patent is extended or adjusted under 35 U.S.C. 154(b) by 2010 days.

(21) Appl. No.: 12/332,140

(22) Filed: Dec. 10, 2008

(65) Prior Publication Data

US 2009/0175356 A1  Jul. 9, 2009

(30) Foreign Application Priority Data

Dec. 11, 2007 (DE) .................. 10 2007 059 606
Apr. 4, 2008 (DE) .................. 10 2008 017 290

(51) Int. Cl.
*H04N 19/61* (2014.01)
*H04N 21/235* (2011.01)
(Continued)

(52) U.S. Cl.
CPC ........... *H04N 19/61* (2014.11); *H04N 21/235* (2013.01); *H04N 21/2381* (2013.01);
(Continued)

(58) Field of Classification Search
USPC ....................................... 370/395.62; 725/62
See application file for complete search history.

(56) References Cited

U.S. PATENT DOCUMENTS 5,216,503 A  6/1993  Paik et al.
5,506,844 A  4/1996  Rao
(Continued)

FOREIGN PATENT DOCUMENTS

DE  199 60 295    6/2001
DE  196 17 293    11/2001
(Continued)

OTHER PUBLICATIONS

Advanced Television Systems Committee, "ATSC Digital Television Standard (A/53) Revision E with Amendment No. 1", Apr. 18, 2006.*
(Continued)

*Primary Examiner* — Joseph Bednash
(74) *Attorney, Agent, or Firm* — Fitzpatrick, Cella, Harper & Scinto

(57) ABSTRACT

A method and a device for forming a common transport datastream from several mobile-digital television signal datastreams and a common stationary-digital television signal datastream. A constant number of data units of respectively-constant size in every successive time interval with constant cycle duration for the transmission of every individual datastream is determined. A data structure is specified for the common datastream with successive sequences in each case of a constant number of data units with respectively-identical positions for data units of the stationary-digital television signal and respectively-identical positions for data units of the mobile-digital television signal. Data units of each of the datastreams of the mobile-digital television signal are transmitted in each case in associated, identical positions of at least one successive sequence, and define the individual positions of the data structure of the common datastream with data units of the respectively associated datastreams.

12 Claims, 11 Drawing Sheets

(51) Int. Cl.
  *H04N 21/236* (2011.01)
  *H04N 21/2365* (2011.01)
  *H04N 21/2381* (2011.01)
  *H04N 21/2383* (2011.01)
  *H04N 21/2665* (2011.01)
  *H04N 21/435* (2011.01)

(52) U.S. Cl.
  CPC ... *H04N 21/2383* (2013.01); *H04N 21/23608* (2013.01); *H04N 21/23655* (2013.01); *H04N 21/2665* (2013.01); *H04N 21/435* (2013.01)

(56) References Cited

U.S. PATENT DOCUMENTS

| | | | |
|---|---|---|---|
| 5,614,914 A | | 3/1997 | Bolgiano et al. |
| 5,835,493 A | * | 11/1998 | Magee et al. ............ 370/395.62 |
| 5,903,574 A | | 5/1999 | Lyons |
| 5,966,120 A | | 10/1999 | Arazi et al. |
| 6,005,605 A | | 12/1999 | Kostreski et al. |
| 6,088,337 A | | 7/2000 | Eastmond et al. |
| 6,118,797 A | | 9/2000 | O'Shea |
| 6,130,898 A | | 10/2000 | Kostreski et al. |
| 6,192,070 B1 | | 2/2001 | Poon et al. |
| 6,269,092 B1 | | 7/2001 | Schilling |
| 6,313,885 B1 | | 11/2001 | Patel et al. |
| 6,324,186 B1 | | 11/2001 | Mahn |
| 6,335,766 B1 | | 1/2002 | Twitchell et al. |
| 6,414,720 B1 | | 7/2002 | Tsukidate et al. |
| 6,477,180 B1 | | 11/2002 | Aggarwal et al. |
| 6,480,236 B1 | | 11/2002 | Limberg |
| 6,496,477 B1 | | 12/2002 | Perkins et al. |
| 6,507,618 B1 | | 1/2003 | Wee et al. |
| 6,631,491 B1 | | 10/2003 | Shibutani et al. |
| 6,640,239 B1 | | 10/2003 | Gidwani |
| 6,678,260 B2 | | 1/2004 | Proctor, Jr. |
| 6,721,337 B1 | | 4/2004 | Kroeger et al. |
| 6,727,847 B2 | | 4/2004 | Rabinowitz et al. |
| 6,728,467 B2 | | 4/2004 | Oshima |
| 6,744,789 B1 | | 6/2004 | Michener |
| 6,772,434 B1 | | 8/2004 | Godwin |
| 6,801,499 B1 | | 10/2004 | Anandakumar et al. |
| 6,804,223 B2 | | 10/2004 | Hoffmann et al. |
| 6,816,204 B2 | | 11/2004 | Limberg |
| 6,861,964 B2 | | 3/2005 | Breti et al. |
| 6,862,707 B2 | | 3/2005 | Shin |
| 6,879,720 B2 | | 4/2005 | Sarachik et al. |
| 6,930,983 B2 | | 8/2005 | Perkins et al. |
| 6,996,133 B2 | | 2/2006 | Bretl et al. |
| 7,110,048 B2 | | 9/2006 | Weiss |
| 7,111,221 B2 | | 9/2006 | Birru et al. |
| 7,197,685 B2 | | 3/2007 | Limberg |
| 7,310,354 B2 | | 12/2007 | Fimoff et al. |
| 7,324,545 B2 | | 1/2008 | Chuah et al. |
| 7,336,646 B2 | | 2/2008 | Muller |
| 7,349,675 B2 | | 3/2008 | Karr et al. |
| 7,382,838 B2 | | 6/2008 | Peting |
| 7,496,094 B2 | | 2/2009 | Gopinath et al. |
| 7,532,677 B2 | | 5/2009 | Simon |
| 7,532,857 B2 | | 5/2009 | Simon |
| 7,539,247 B2 | | 5/2009 | Choi et al. |
| 7,551,675 B2 | | 6/2009 | Kroeger |
| 7,554,912 B2 | | 6/2009 | Rodriguez-Sanchez et al. |
| 7,558,279 B2 | | 7/2009 | Hwang et al. |
| 7,564,905 B2 | | 7/2009 | Park et al. |
| 7,593,474 B2 | | 9/2009 | Jeong et al. |
| 7,599,348 B2 | | 10/2009 | Kang et al. |
| 7,602,749 B2 | | 10/2009 | Proctor, Jr. |
| 7,667,780 B2 | | 2/2010 | Weiss |
| 7,702,337 B2 | | 4/2010 | Vare et al. |
| 7,715,491 B2 | | 5/2010 | Yu et al. |
| 7,733,819 B2 | | 6/2010 | Lee et al. |
| 7,779,327 B2 | | 8/2010 | Lee et al. |
| 7,783,316 B1 | | 8/2010 | Mitchell |
| 7,801,181 B2 | | 9/2010 | Song et al. |
| 7,804,909 B2 | | 9/2010 | Choi et al. |
| 7,822,134 B2 | | 10/2010 | Kim et al. |
| 7,830,974 B2 | | 11/2010 | Choi et al. |
| 7,852,961 B2 | | 12/2010 | Chang et al. |
| 7,856,590 B2 | | 12/2010 | Kim et al. |
| 7,933,351 B2 | | 4/2011 | Kim et al. |
| 7,953,160 B2 | | 5/2011 | Gordon et al. |
| 8,009,662 B2 | | 8/2011 | Lee et al. |
| 2001/0017849 A1 | | 8/2001 | Campanella et al. |
| 2002/0085548 A1 | | 7/2002 | Ku et al. |
| 2002/0170060 A1 | | 11/2002 | Lyman |
| 2003/0053493 A1 | | 3/2003 | Graham Mobley et al. |
| 2003/0099303 A1 | | 5/2003 | Birru et al. |
| 2003/0100267 A1 | | 5/2003 | Itoh et al. |
| 2003/0128826 A1 | | 7/2003 | Benini et al. |
| 2003/0206596 A1 | | 11/2003 | Carver et al. |
| 2005/0013249 A1 | | 1/2005 | Kong et al. |
| 2005/0044475 A1 | | 2/2005 | Yedidia et al. |
| 2005/0046600 A1 | | 3/2005 | Bretl et al. |
| 2005/0074074 A1 | | 4/2005 | Limberg |
| 2005/0084023 A1 | | 4/2005 | Bott et al. |
| 2005/0147186 A1 | | 7/2005 | Funamoto et al. |
| 2005/0207416 A1 | | 9/2005 | Rajkotia |
| 2005/0238100 A1 | | 10/2005 | Hsiao et al. |
| 2005/0249300 A1 | | 11/2005 | Jeong et al. |
| 2005/0249301 A1 | | 11/2005 | Jeong et al. |
| 2006/0002464 A1 | | 1/2006 | Choi et al. |
| 2006/0050770 A1 | | 3/2006 | Wallace et al. |
| 2006/0067266 A1 | | 3/2006 | Ehlers et al. |
| 2006/0126556 A1 | | 6/2006 | Jiang et al. |
| 2006/0200852 A1 | | 9/2006 | Simon |
| 2006/0200853 A1 | | 9/2006 | Simon |
| 2006/0211436 A1 | | 9/2006 | Paila et al. |
| 2006/0244865 A1 | | 11/2006 | Simon |
| 2006/0245516 A1 | | 11/2006 | Simon |
| 2007/0066272 A1 | | 3/2007 | Vassiliou et al. |
| 2007/0074267 A1 | | 3/2007 | Clerget et al. |
| 2007/0091857 A1 | | 4/2007 | Elstermann |
| 2007/0143810 A1 | | 6/2007 | Yousef |
| 2007/0174880 A1 | | 7/2007 | Fite et al. |
| 2007/0189410 A1 | | 8/2007 | Zeng |
| 2007/0230460 A1 | | 10/2007 | Jeong et al. |
| 2008/0056219 A1 | | 3/2008 | Venkatachalam |
| 2008/0175148 A1 | | 7/2008 | Todd et al. |
| 2008/0181112 A1 | | 7/2008 | Beck et al. |
| 2008/0205215 A1 | | 8/2008 | Kikuchi et al. |
| 2008/0209464 A1 | | 8/2008 | Wright-Riley |
| 2008/0211969 A1 | | 9/2008 | Simon et al. |
| 2008/0247442 A1 | | 10/2008 | Orlik et al. |
| 2008/0254739 A1 | | 10/2008 | Kidd et al. |
| 2008/0259835 A1 | | 10/2008 | Venkatachalam et al. |
| 2008/0273698 A1 | | 11/2008 | Manders et al. |
| 2009/0003432 A1 | | 1/2009 | Liu et al. |
| 2009/0013356 A1 | * | 1/2009 | Doerr et al. .................... 725/62 |
| 2009/0016435 A1 | | 1/2009 | Brandsma et al. |
| 2009/0034442 A1 | | 2/2009 | Song et al. |
| 2009/0040962 A1 | | 2/2009 | Oger et al. |
| 2009/0100459 A1 | | 4/2009 | Riedl et al. |
| 2009/0201997 A1 | | 8/2009 | Kim et al. |
| 2009/0228764 A1 | | 9/2009 | Lee et al. |
| 2009/0228765 A1 | | 9/2009 | Lee et al. |
| 2009/0252266 A1 | | 10/2009 | Heinemann et al. |
| 2009/0265751 A1 | | 10/2009 | Limberg |
| 2009/0293086 A1 | | 11/2009 | Lutterbach et al. |
| 2010/0023972 A1 | | 1/2010 | Summers et al. |
| 2010/0142446 A1 | | 6/2010 | Schlicht et al. |
| 2010/0142447 A1 | | 6/2010 | Schlicht et al. |
| 2010/0150182 A1 | | 6/2010 | Noronha, Jr. |
| 2010/0254449 A1 | | 10/2010 | Rusch-Ihwe |
| 2011/0170015 A1 | | 7/2011 | Kim et al. |
| 2011/0230202 A1 | | 9/2011 | Wood et al. |

FOREIGN PATENT DOCUMENTS

| | | |
|---|---|---|
| DE | 101 12 773 | 9/2002 |
| DE | 10 2006 015 393 | 10/2007 |
| DE | 10 2007 012 465 | 5/2008 |
| EP | 0 837 609 A2 | 4/1998 |
| EP | 0 926 894 | 6/1999 |
| EP | 1 079 631 A1 | 2/2001 |

(56) References Cited

FOREIGN PATENT DOCUMENTS

| | | | |
|---|---|---|---|
| EP | 1337071 A2 * | 8/2003 | ............ H04L 12/12 |
| EP | 1 670 150 | 6/2006 | |
| EP | 1 753 249 A2 | 2/2007 | |
| EP | 1 950 962 A1 | 7/2008 | |
| EP | 1 965 386 A1 | 9/2008 | |
| EP | 1 965 389 A2 | 9/2008 | |
| GB | 2 399 719 | 9/2004 | |
| WO | 02/03728 | 1/2002 | |
| WO | 03/009590 | 1/2003 | |
| WO | 03/045064 | 5/2003 | |
| WO | 2004/062183 A1 | 7/2004 | |
| WO | 2004/062283 | 7/2004 | |
| WO | 2006/046107 | 5/2006 | |
| WO | 2006/066617 A1 | 6/2006 | |
| WO | 2006/084361 | 8/2006 | |
| WO | 2006/094050 A2 | 9/2006 | |
| WO | 2007/046672 | 4/2007 | |
| WO | 2007/114653 | 10/2007 | |
| WO | 2008/042694 | 4/2008 | |
| WO | 2008/100000 A1 | 8/2008 | |
| WO | 2008/117981 A1 | 10/2008 | |
| WO | 2009/016175 | 2/2009 | |
| WO | 2010/000407 | 1/2010 | |

OTHER PUBLICATIONS

ATSC Digital Television Standard (A/53) Revision E, Advanced Television Systems Committee, Dec. 27, 2005.
ATSC Recommended Practice: Design of Synchronized Multiple Transmitter Networks (A/111), Advanced Television Systems Committee, Sep. 3, 2004.
ATSC Standard: Synchronization Standard for Distributed Transmission (A/110), Advanced Television Systems Committee, Jul. 14, 2004.
ATSC Standard: Synchronization Standard for Distributed Transmission, Revision A (A/110A), Advanced Television Systems Committee, Jul. 19, 2005.
ATSC Standard: Synchronization Standard for Distributed Transmission, Revision B (A/110B), Advanced Television Systems Committee, Dec. 24, 2007.
ATSC Technology Group Report: DTV Signal Reception and Processing Considerations, Doc. T3-600r4, Advanced Television Systems Committee, Sep. 18, 2003.
Battisa, "Spectrally Efficient High Data Rate Waveforms for the UFO SATCOM Channel", Military Communications Conference, MILCOM 98, Proceedings, Oct. 18-21, 1998, pp. 134-139, IEEE vol. 1.
Citta, R., et al., "ATSC Transmission System: VSB Tutorial", Zenith Electronics Corporation, Symposium Handout, Montreuz Symposium, Jun. 12, 1997.
"Digital Video Broadcasting (DVB); DVB Mega-Frame for Single Frequency Network (SFN) Synchronization", European Broadcasting Union; eTSI TS 101 191 v1.4.1, Jun. 2004.
International Preliminary Report on Patentability, PCT/US2006/007265, Oct. 4, 2007.
International Preliminary Report on Patentability, PCT/EP2008/000837, Aug. 6, 2009.
International Preliminary Report on Patentability, PCT/US2006/020599, Nov. 30, 2007.
International Preliminary Report on Patentability, PCT/US2006/022300, Dec. 27, 2007.
International Search Report and Written Opinion of the International Searching Authority, PCT/EP2008/000837, Aug. 12, 2008.
International Search Report and Written Opinion of the International Searching Authority, PCT/US2006/007251, May 20, 2008.
International Search Report and Written Opinion of the International Searching Authority, PCT/US2006/007265, Sep. 4, 2007.
International Search Report and Written Opinion of the International Searching Authority, PCT/US2006/015317, May 14, 2008.
International Search Report and Written Opinion of the International Searching Authority, PCT/US2006/020599, Aug. 31, 2007.
International Search Report and Written Opinion of the International Searching Authority, PCT/US2006/022300, Mar. 29, 2007.
Lecture 4: Digital Television The DVB transport stream, obtained from http://www.abo.fi/~jbjorkqv/digitv/lect4.pdf (last visited May 4, 2006).
Lee, Y., et al., "ATSC Terrestrial Digital Television Broadcasting Using Single Frequency Networks", ETRI Journal, Apr. 2004, pp. 92-100, vol. 26, No. 2.
Owen, H., "Proposed Modifications to ATSC Digital Television Standard to Improve Performance in the Face of Dynamic Multipath for Both Fixed and Mobile Operation", Sarnoff Corporation, Apr. 2, 2001, Princeton, New Jersey.
Patel, C. B., et al., "Proposal to ATSC Subcommittee T3/59 to Provide 8-VSB With a Repetitive-PN1023 Signal for Rapidly and Reliably Initializing Tracking in an Adaptive Equalizer Despite Adverse Multipath Conditions", Apr. 12, 2001.
Proposal for Enhancement of ATSC RF Transmission System (Revision to A/53), submitted by Samsung, Draft ver. 1.0, Sep. 16, 2004.
Raghunandan, K., "Satellite Digital Audio Radio Service (SDARS) System Architecture and Receiver Review", IEEE, Oct. 27, 2005.
Vogel, W. J., et al., "Propagation Effects and Satellite Radio Design", Paper No. 1445, Maastricht Exhibition and Congress Centre (MECC), Aug. 17-24, 2002, Maastricht, the Netherlands.
Wang, "A New Implementation of Single Frequency Network Based on DMB-T", 2004 International Conference on Communications, Circuits and Systems (2004 ICCCAS), Jun. 27-29, 2004, pp. 246-249, vol. 1.
Wang, X., et al., "Transmitter Identification in Distributed Transmission Network and Its Applications in Position Location and a New Data Transmission Scheme", NAB Broadcast Engineering Conference, Apr. 16-21, 2005, pp. 511-520, Las Vegas, Nevada.
Whitaker, J. C., "Standard Handbook of Video and Television Engineering", Chapter 17.2 "ATSC DTV Received Systems", 2000, pp. 17-63 to 17-99.
ATSC Digital Television Standard (A/53), "Annex D: RF/Transmission Systems Characteristics", Sep. 16, 1995, pp. 46-60.
"European Broadcasting Union Union Europeenne de Radio-Television Digital Video Broadcasting (DVB); Specification for Service Information (SI) in DVB systems; ETS 300 468", ETSI Standards, Lis, Sophia Antipolis Cedex, France, vol. BC, Second Edition, Jan. 1, 1997, pp. 1-72.
"Universal Mobile Telecommunication Systems (UMTS); Introduction of the Multimedia Broadcast/Multicast Service (MBMS) in the Radio Access Network (Ran); Stage 2" (3GPP TS 25.346 version 7.4.0 Release 7); ETSI TS 125 346 No. V7.4.0 (Jun. 2007), IEEE, Lis, Sophia Antipolis Cedex, France, vol. 3-R2, No. V7.4.0, Jun. 1, 2007.
Lee et al., "ATSC Terrestrial Digital Television Broadcasting Using Single Frequency Networks", XP-002556814, ETRI Journal, vol. 26, No. 2, Apr. 2004, pp. 92-100.
"ATSC Digital Television Standard (Annex D), RF/Transmission Systems Characteristics", Advanced Television Systems Committee, Sep. 16, 1995, pp. 46-60.
Yucek, T., et al., "A Survey of Spectrum Sensing Algorithms for Cognitive Radio Applications," IEEE Communications Surveys & Tutorials, Mar. 4, 2009, pp. 116-130, vol. 11, No. 1.
Peha, J. M., "Sharing Spectrum Through Spectrum Policy Reform and Cognitive Radio," Proceedings of the IEEE, Apr. 2009, pp. 708-719, vol. 97, No. 4.
Zhao, Y., et al., "Experimental Study of Utility Function Selection for Video Over IEEE 802.22 Wireless Regional Area Networks," 5th International Conference on Testbeds and Research Infrastructures for the Development of Networks & Communities and Workshops, 2009, Dates of Conference: Apr. 6-8, 2009, pp. 1-10.
Lee, J. M., et al., "Adaptive Hybrid Transmission Mechanism for On-Demand Mobile IPTV Over WiMax," IEEE Transactions on Broadcasting, Jun. 2009, pp. 468-477, vol. 55, No. 2.

(56) References Cited

OTHER PUBLICATIONS

Wen C. C., et al., "Hybrid Tree Based Explicit Routed Multicast for QoS Supported IPTV Service," Proceedings of the IEEE Global Telecommunications Conference, 2009, Dates of Conference: Nov. 30, 2009-Dec. 4, 2009, pp. 1-6.

Ding, J. W., et al., "Quality-Aware Bandwidth Allocation for Scalable On-Demand Streaming in Wireless Networks," IEEE Journal on Selected Areas in Communications, Apr. 2010, pp. 366-376, vol. 28, No. 3.

Sachs, J., et al., "Cognitive Cellular Systems Within the TV Spectrum," IEEE Symposium on New Frontiers in Dynamic Spectrum, 2010, Dates of Conference: Apr. 6-9, 2010, pp. 1-12.

Karimi, H. R., et al., "European Harmonized Technical Conditions and Band Plans for Broadband Wireless Access in the 790-862 MHz Digital Dividend Spectrum," IEEE Symposium on New Frontiers in Dynamic Spectrum, 2010, Dates of Conference: Apr. 6-9, 2010, pp. 1-9.

\* cited by examiner

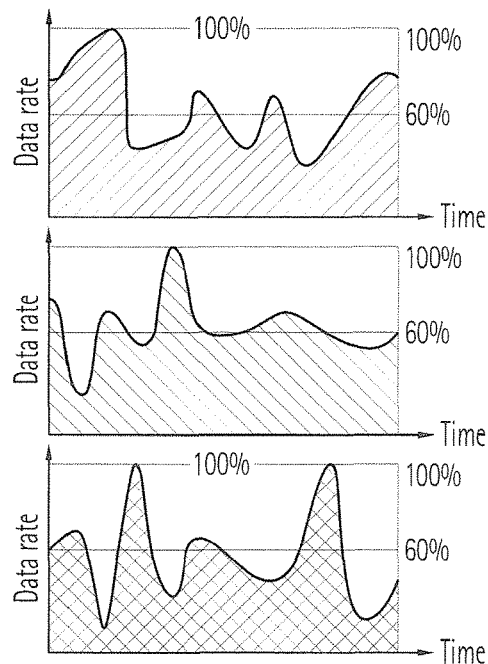
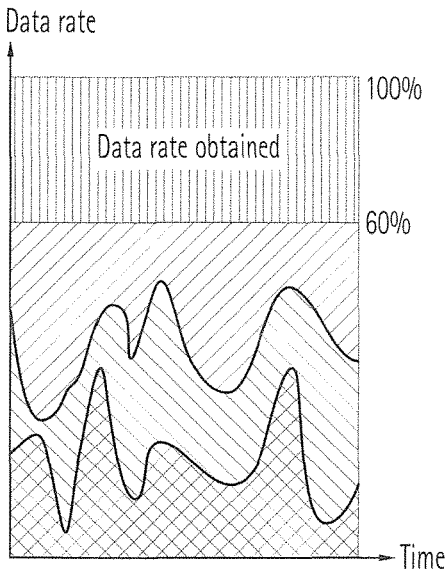
Fig. 2A
Fig. 2B
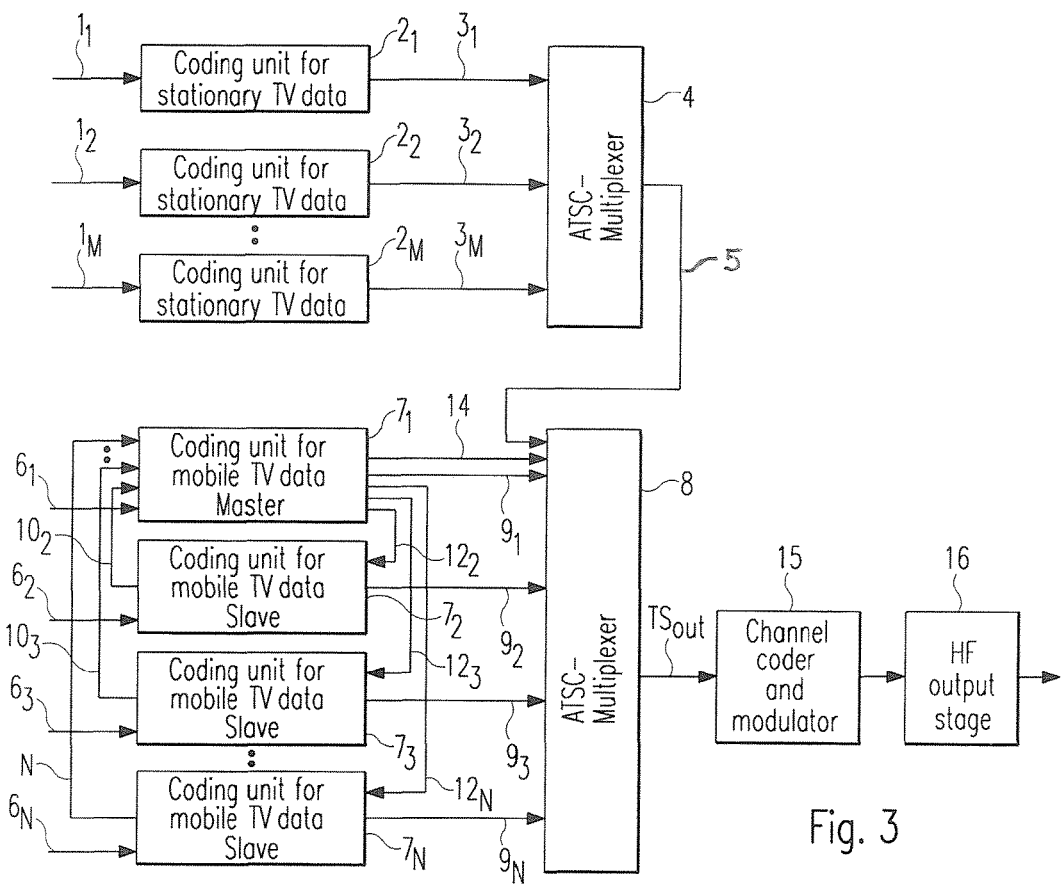
Fig. 3

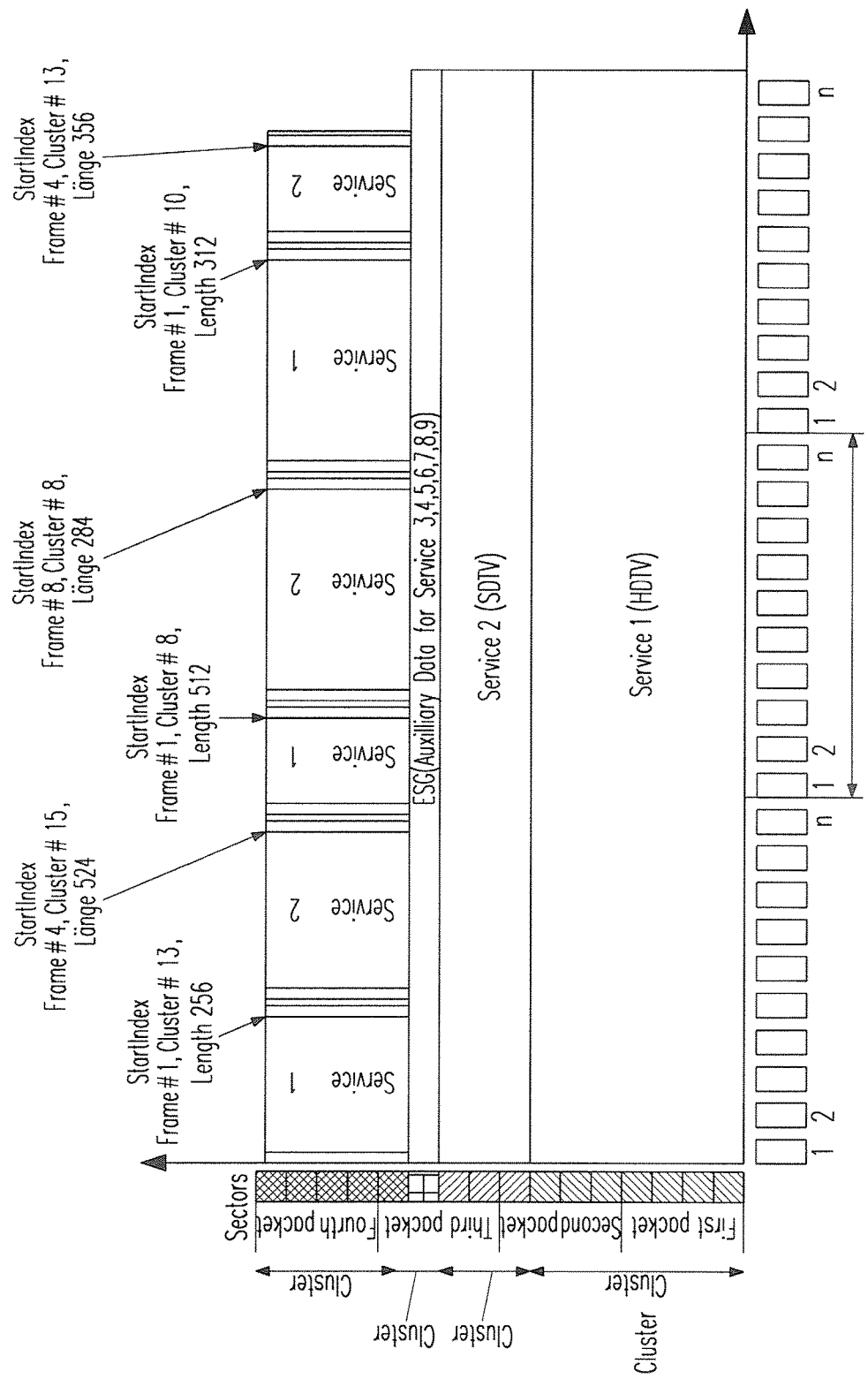

METHOD AND DEVICE FOR FORMING A COMMON DATASTREAM ACCORDING TO THE ATSC STANDARD

BACKGROUND

Field

The present invention relates to methods and devices for forming a common datastream from several datastreams based on the Advanced Television Systems Committee (ATSC) standard.

Related Art

The transmission of digital-television signals in the USA and in some other countries—for example, in South Korea—is implemented according to the Advanced Television Systems Committee (ATSC) standard. The digital-television signals in this context are coded according to an MPEG-2-coding algorithm and transferred in data packets without synchronization information to stationary, localized television devices, as known, for example, from WO 2006/094050 A2.

The existing transmitter network for stationary, localized television devices is to be used for the transmission of digital-television signals to mobile telephone devices. Furthermore, the existing receivers of the stationary, localized television devices must still be able to receive the digital-television signals transmitted in the ATSC data packets without upgrading. Accordingly, the useful data for mobile-digital television in addition to the useful data for stationary-digital television must be integrated in ATSC data packets.

FIG. 1 illustrates a data structure of an ATSC transport-stream data packet. Signals are sent to the receivers of stationary-television devices and mobile telephones via the signalization field "Adaptation Field Control". The Adaptation Field Control field indicates whether the useful-data fields "Stuffing Bytes", which are designated for useful data of the mobile-digital television and, if required, in the useful data fields "Payload Data", which are determined at origin of the useful data of the stationary-digital television. If useful data for mobile-digital television are transmitted in the currently-transmitted ATSC data packet, the entire length of the useful data for mobile-digital television can be obtained from the data field "Adaptation Field Length", and the additional demand for useful data of mobile-digital television required in the useful data field "Payload Data" can be obtained from the data field "Adaptation Field Extension". In this manner, a receiver of a mobile-telephone device can have access to data fields in the useful-data fields "Stuffing Bytes" and optionally in the useful-data fields "Payload Data" and, at the same time, a receiver of a stationary, localized television device can have access to the data fields in the useful-data fields "Payload Data" of the same ATSC data packet remaining for the transmission of useful data of the stationary-digital television.

In the coding of the mobile-digital television signals—typically with an H.264 encoder—a datastream is formed. The data rate of the datastream is dependent upon the image content to be transmitted at the respective time or upon the dynamic of the image contents to be transmitted—time variation of the image content. Consequently, the maximum-required data rate must be reserved at the output of a respective coder. Since this maximum data rate is required only at given times or phases, the transmission channel between transmitter and receiver is disadvantageously loaded in a comparatively inefficient manner.

BRIEF DESCRIPTION

The example embodiments described herein provide methods and associated devices for forming and transmitting a common datastream of stationary and mobile digital-television signals, which result in efficient loading of a transmission channel.

According to an embodiment, a cycle time $\Delta T$ of successive time intervals, in which each of the individual datastreams of the stationary and mobile digital television respectively provide a constant number $n_1, n_2, \ldots, n_N, n_{StatTV}$ of data units of a given, previously-specified data size, is determined for every datastream of the mobile-digital television (television signal) to be transmitted—corresponding to a TV program or TV channel of the mobile-digital television—and for the common datastream of the stationary-digital television (television signal), subject to the condition that the individual datastreams associated with each TV program have already been multiplexed via a statistical multiplexer to form a common datastream of the stationary-digital television.

On the basis of the number $n_1, n_2, \ldots, n_N, n_{StatTV}$ of data units determined for every datastream per time interval, a data structure, which distributes the summed number $n_{At}$ of data units to be transmitted per time interval over a given number $n_{Seq}$ of sequences of data units to be transmitted successively, is specified for the common datastream to be transmitted. Each sequence provides a constant number $n_{DESeq}$ of data units, a constant number $n_{StatTVSeq}$ of identically-reserved positions for data units of the stationary-digital television and a constant number $n_{MobTVSeq}$ of identically-reserved positions for data units of the mobile-digital television. In each case, the data units from one of the datastreams of the mobile-digital television are transmitted in the positions of respectively-successive sequences reserved for data units of the mobile-digital television.

After the specification of the data structure of the common datastream, the individual positions of every successive sequence provided for data units are defined in every time interval with the data units respectively specified for this purpose.

In a first embodiment, all of the $n_{MobTVSeq}$ positions reserved for data units of mobile-digital television in a given number $k_1, k_2, k_3, \ldots$ of successive sequences are defined in each case with data units of a single datastream of the mobile-digital television.

In a second embodiment, in each case, a given number $l_1, l_2, l_3, \ldots$ of the $n_{MobTVSeq}$ positions of a sequence of data units reserved for data units of mobile-digital television are defined in each case in one identical number $k_1, k_2, k_3, \ldots$ of successive sequences of data units of a single datastream of the mobile-digital television.

While in a first variant of the first and second embodiments, the individual data units are packed in a data packet, of which the length extends over the entire length of each sequence of data units, the data units in a second variant of the first and second embodiments are packed in a constant number $n_{DPSeq}$ of data packets for each sequence, each of which provide a constant number $n_{DEDP}$ of data units.

In the first and second variant of the first embodiment, the identically-reserved positions for data units of the mobile-digital television in successive sequences need not necessarily follow one another, especially in the case of the second variant is not necessarily across data-packet boundaries. Instead they can be arranged intermittently at positions, which are reserved in successive sequences for data units of the stationary-digital television.

In a first sub-variant of the first or second variant of the first or second embodiment, a given number $n_{FRAME1}$ of successive sequences of data units are combined to form a first subordinate combination of data units. In a second sub-variant of the first and second variant of the first or second embodiment, a given number $n_{FRAME2}$ of data units following one another in a sequence in each case in several successive sequences are combined to form a second subordinate combination of data units. Additionally, several first or second subordinate combinations of data units can be bundled to form first or second superordinate combinations of data units, wherein further bundling of first or second superordinate combinations of data units can be realized.

For the determination of the number $n_{MobTVSeq}$ of positions reserved in every sequence of data units for data units of mobile-digital television in the case of the first embodiment, the integer greatest common divisor is calculated from each number $n_1, n_2, \ldots, n_N$ of data units determined respectively for one datastream of mobile-digital television. In order to achieve an integer greatest common divisor, the one or the other determined number $n_1, n_2, \ldots, n_N$ of data units can, for example, be rounded up as required.

The number $k_1, \ldots, k_i, \ldots, k_N$ of successive sequences required for each individual datastream of mobile-digital television in each individual time interval is obtained in this context as the division factor of the individual respectively-determined number $n_1, n_2, \ldots, n_N$ of data units in the determination of the greatest common divisor.

In the case of the second embodiment, for calculating the greatest common divisor, the respective summed numbers $$n_{Par1} = \sum_i n_i, n_{Par2} = \sum_j n_j, n_{Par3} = \sum_k n_k, \ldots$$

of data units of those datastreams of mobile-digital television, which are transmitted in each case simultaneously in identical successive sequences, are used for the determination of the number $n_{MobTVSeq}$ of positions in every sequence of data units reserved for data units of mobile-digital television, and rounded accordingly, if required, in order to achieve an integer greatest common divisor.

In this context, the number $k_1, k_2, \ldots$ of successive sequences, which are transmitted in each case simultaneously in identical successive sequences, required respectively for the transmission of datastreams of mobile-digital television, is obtained as a division factor of the individual summed numbers $$n_{Par1} = \sum_i n_i, n_{Par2} = \sum_j n_j, n_{Par3} = \sum_k n_k, \ldots$$

of data units of the datastreams transmitted in each case simultaneously in identical, successive sequences in the determination of the greatest common divisor.

The number $n_{Seq}$ of sequences, in which data units of stationary-digital television and simultaneously the sum of all data units of mobile-digital television per time interval is transmitted, is obtained for the first or respectively second embodiment of the method according to the invention from the sum of the number $k_1, \ldots, k_i, \ldots, k_N$ or $k_1, k_2, \ldots$ of successive sequences, in which data units of one or more datastreams are transmitted.

The number $n_{StatTVSeq}$ of positions in every sequence reserved for data units of stationary-digital television is obtained by dividing the determined number $n_{StatTV}$ of data units of stationary-digital television per time interval by the calculated number of sequences $n_{Seq}$ per time interval.

The constant number $n_{DESeq}$ of data units for every sequence of data units is finally obtained from the sum of the number $n_{StatTVSeq}$ of positions reserved for data units of stationary-digital television and the number $n_{MobTVSeq}$ of positions reserved for data units of mobile-digital television.

Finally, it is advantageous to transmit image contents in the data units of the first sequences determined for each datastream of mobile-digital television, which allow a complete build-up of the image to be transmitted in the receiver—so-called intra-frames (I-frames), and only variation data from the currently-transmitted image relative to preceding images - so-called predictive frames (P-frames) in all other sequences.

The device according to the invention for forming a common datastream from several datastreams according to the ATSC standard consists of several coding units for coding respectively one datastream of mobile-digital television, a first multiplexer for the generation of an ATSC-compatible common datastream of stationary-digital television from several individual datastreams, coded in each case by an MPEG-2-coding unit of the stationary-digital television and a second multiplexer for the generation of a common datastream from individual datastreams of the mobile-digital television and the common datastream of stationary-digital television.

The common datastream generated by the second multiplexer, which is in conformity with the Advanced-Vestigial-Sideband (A-VSB) standard, is planned with regard to its data structure by a coding unit operating as a superordinate master unit. For this purpose, the coding unit acting as a superordinate master unit receives from the other coding units acting as slave units of the datastreams of the mobile-digital television and the first multiplexer, the necessary demands for transmission capacity and allocates to each datastream the corresponding number of data units to be transmitted and their position in the data structure of the common datastream $TS_{out}$.

BRIEF DESCRIPTION OF THE DRAWING

The features and advantages of the example embodiments of the invention presented herein will become more apparent from the detailed description set forth below when taken in conjunction with the following drawings.

FIGS. 2A, 2B show a time-dependency diagram of the characteristic of the data rate of the datastreams generated by coding units according to a conventional procedure and of the characteristic of the data rate of a common datastream according to an embodiment of the present invention.

FIG. 3 shows an example block-circuit diagram of a device for forming a common datastream from several datastreams according to the ATSC standard and an embodiment of the present invention.

FIGS. 13A, 13B show an example time-dependency diagram of an exemplary data structure of a common datastream according to the AVSB standard.

DETAILED DESCRIPTION

FIG. 2A shows a typical transmission of mobile or stationary digital datastreams. As shown in FIG. 2A, a data-transmission capacity corresponding to the maximum required data-transmission rate over time is reserved for every datastream. On average, over time, only 60% of the data-transmission capacity is required for every datastream. In addition, the demand for data-transmission capacity of each individual datastream over time is different. Therefore, each case mutually supplements itself in a cumulative manner over a time interval of given length to form a constant, summed demand for data-transmission capacity over all time intervals. As shown in FIG. 2B, using a statistical multiplexer, the cycle time $\Delta T$ of successive time intervals, in which each of the individual datastreams of the stationary and mobile-digital television (television signals) respectively provide a constant number $n_1, n_2, \ldots, n_N, n_{StatTV}$ of data units of a given, previously-specified data size is determined.

Figure 1:
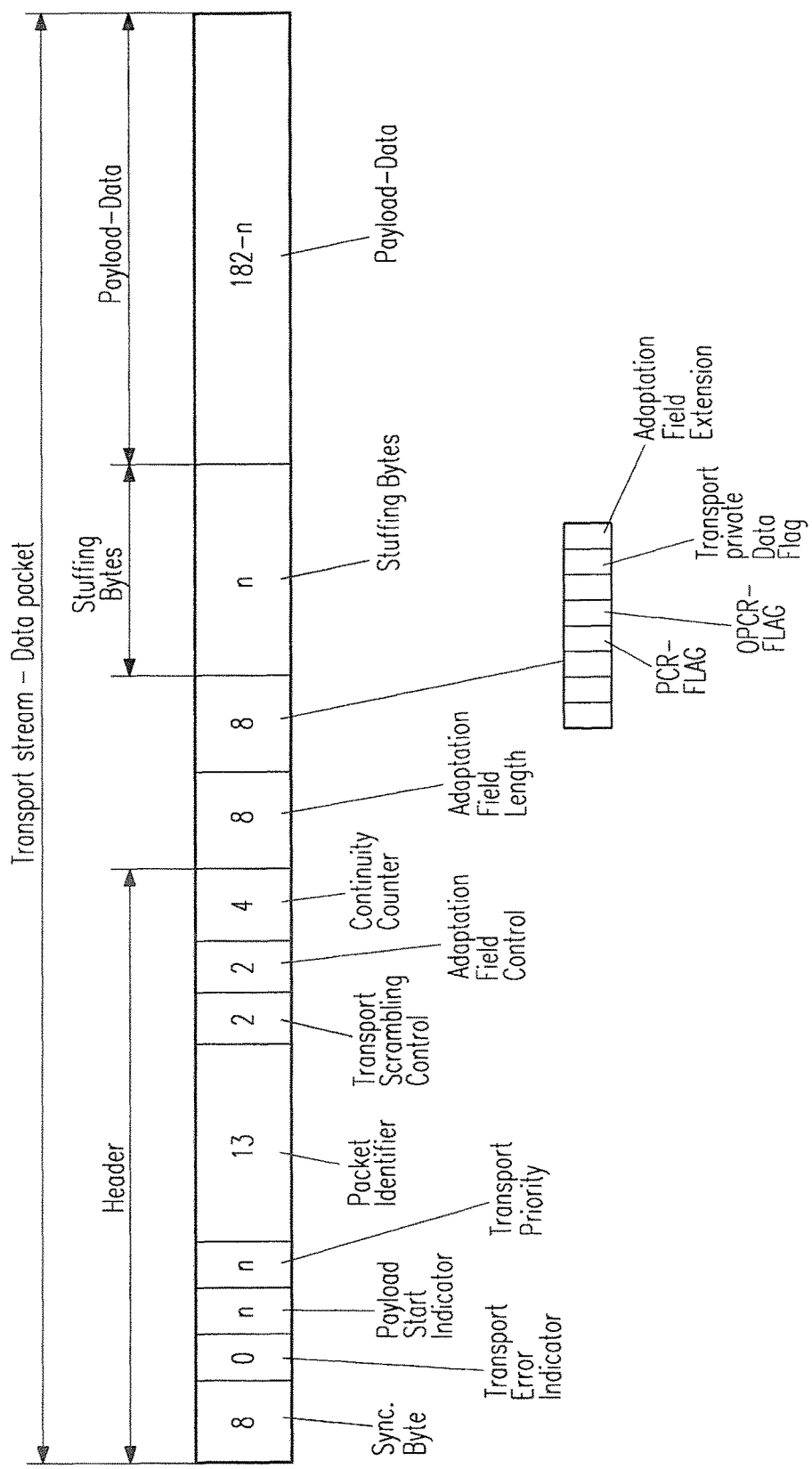
FIG. 1 shows a diagram of the data structure of an ATSC data packet.
Figure 4:
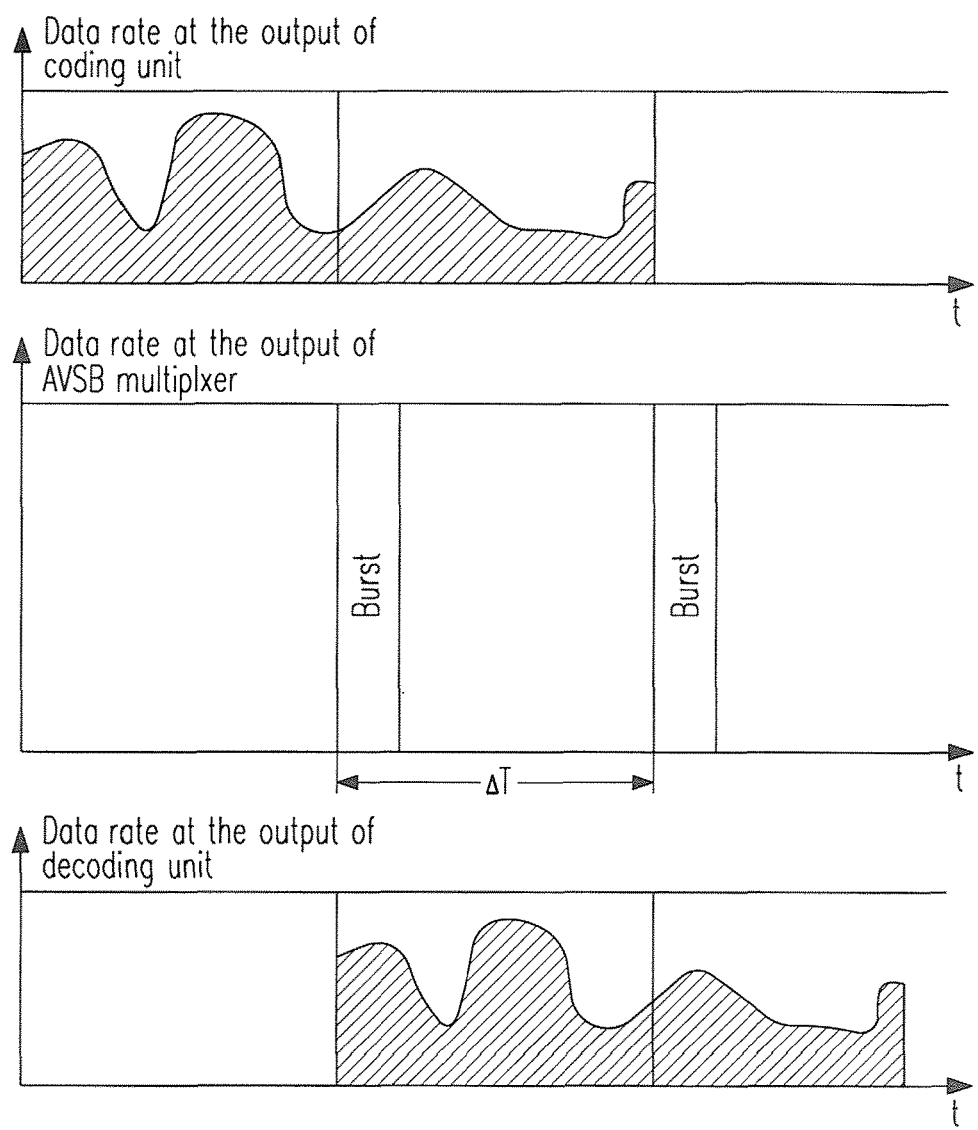
FIG. 4 shows an example time-dependency diagram of the characteristic of the data rate of a datastream at the output of a coding unit, at the output of a device for forming of a common datastream from several datastreams according to the ATSC standard, and at the output of a decoding unit according to an embodiment of the present invention.

In this manner it is possible to transmit for every datastream, at the output of the associated coding unit corresponding to its time-variable demand for data-transmission capacity in every time interval, respectively one burst signal, as shown in FIG. 4. The burst duration and burst data rate are selected in such a manner that the demand occurring for data-transmission capacity in every time interval for each datastream is transmitted by the burst signal, which is capable of transmitting the data volume. At the output of the associated decoding unit in the receiver, a datastream corresponding to the time-variable datastream at the output of the coding unit in the transmitter is generated from the burst signal. The burst signal is delayed only by the cycle time $\Delta T$ of the individual time intervals relative to the datastream at the output of the coding unit in the transmitter. Transmitting data in time-limited burst signals allows the reception components in the receiving mobile telephone device to be switched off in the time periods between the individual burst signals, and accordingly achieves a more efficient handling of the limited energy resources of the mobile telephone device.

FIG. 3 shows an example block-circuit diagram of a device for forming a common datastream from several datastreams according to the ATSC standard and an embodiment of the present invention. Generally, FIG. 3 illustrates how a burst-signal-supported data transmission for a single datastream according to FIG. 4 is expanded to the data transmission of several datastreams—that is to say, several TV channels—of the mobile-digital television. In addition, FIG. 3 illustrates how a burst-signal-supported data transmission is integrated for several datastreams of the mobile-digital television into the data-packet-based data transmission of the stationary-digital television according to the Advanced Television Systems Committee (ATSC) standard.

As shown in FIG. 3, each of the datastreams $1_1, 1_2, \ldots, 1_M$ associated with a digital television channel, which is determined for a stationary, localized television reception device, is coded respectively in an associated coding unit $2_1, 2_2, \ldots, 2_M$ according to a coding method suitable for video and audio compression—preferably according to the MPEG-2-standard. The coded datastreams $3_1, 3_2, \ldots, 3_M$ are bundled in a first multiplexer 4 to form a common datastream 5 with transport-stream packets, preferably according to the ATSC standard A/53D.

Datastreams $6_1, 6_2, 6_3, \ldots, 6_N$ associated with a digital television channel for a mobile telephone device are coded in each case in an associated coding unit $7_1, 7_2, 7_3, \ldots, 7_N$ according to a very efficient audio and video compression method, preferably according to the MPEG-4-3 (AAC) for audio coding and MPEG-4-10 (H.264/AVC) for video coding. In order to generate a common datastream $TS_{out}$ (also referred to as "common transport datastream") from individual coded datastreams $9_1, 9_2, 9_3, \ldots, 9_N$ of the mobile-digital television and the common datastream 5 of the stationary-digital television in a second multiplexer 8 connected downstream of the individual coding units $7_1, 7_2, 7_3, \ldots, 7_N$, its data structure according to the invention must be planned in the coding unit $7_1$ acting as a master unit.

For this purpose, the master unit $7_1$ receives the demand for data transmission capacity in a specific observation period from the other coding units $7_2, 7_3, \ldots, 7_N$ acting respectively as slave units of the mobile-digital television via the signal lines $10_2, 10_3, \ldots, 10_N$. From these demands, the coding unit $7_1$ acting as master unit determines the data rate of the common datastream $TS_{OUT}$ as shown in FIG. 2B and, via signal lines $12_2, 12_3, \ldots, 12_N$, allocates appropriate data rates for the coded datastreams $9_1, 9_2, 9_3, \ldots, 9_N$ to the individual coding units $7_2, 7_3, \ldots, 7_N$ acting as slave units. Via a signal line 14, the second multiplexer 8 receives from the coding unit $7_1$ acting as the master unit information including positions of the individual data units associated with the individual datastreams of the stationary and mobile-digital television within the individual successive sequences for every individual, cyclical successive time interval. This information is used to build a data structure of the common datastream $TS_{out}$.

Baseband signal processing (e.g., channel coding, modulation) of the generated common datastream $TS_{out}$ is implemented in a channel coder and modulator 15 adjoining the second multiplexer 8. The modulation signal containing the common datastream $TS_{out}$ is amplified in a high-frequency output stage 16 and supplied to a transmitter antenna.

The coding unit $7_1$ acting as the master unit, the second multiplexer 8 and the channel coder and modulator 15 preferably operate according to the Advanced Vestigial Sideband (AVSB) standard.

FIGS. 6, 7, 8, 9, 10A, 10B, 11 and 12 illustrate preferred data structures of the common datastream $TS_{out}$, which describe in general form, independently of respective concrete specifications for transmission standards and associated versions relevant at present and/or in future, possible characterizations of data structures with packet-orientated datastreams. The sequences of data units presented in individual columns and transmitted in succession consist respectively of $n_{DESeq}$ data units—rectangular boxes in the individual diagrams, wherein respectively $n_{StatTVSeq}$ data units are contained in every sequence for stationary-digital television and respectively $n_{MobTVSeq}$ data units for mobile-digital television. A number $n_{Seq}$ of sequences of data units with respectively $k_1, k_2, \ldots$ sequences of data units for every datastream transmitted individually in each case in successive sequences or for all datastreams of the mobile-digital television transmitted in each case in combination in successive sequences are provided in every successive time interval with the cycle duration $\Delta T$.

Figure 6:
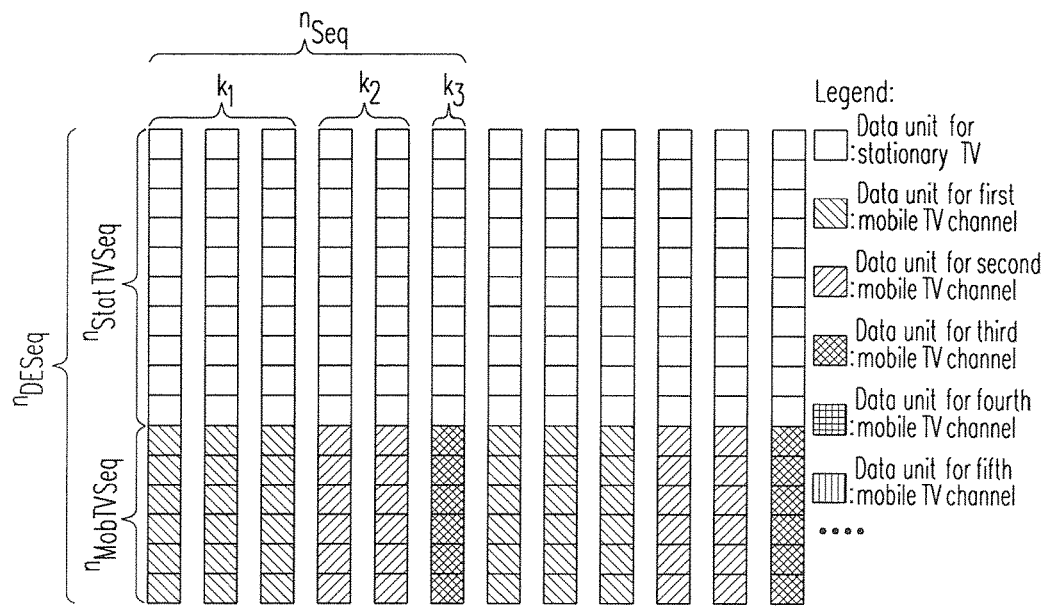
FIG. 6 shows an example time-dependency diagram of a data structure of a common datastream according to the first variant of the first example embodiment of the present invention.

FIG. 6 shows a first variant of a first embodiment of the data structure for the common datastream, in which, in blocks of successive sequences, respectively only positions for data units of a single datastream of the mobile-digital and of the common datastream for stationary-digital television are provided. In this context, for example, in each case 10 positions are provided in every sequence of data units for data units of the stationary-digital television and in each case six positions for data units of the mobile-digital television. In every time interval, respectively $k_1=3$ sequences of data units for data units of a first mobile TV channel, $k_2=2$ sequences of data units for data units of a second mobile TV channel and $k_3=1$ sequences of data units for data units of a third mobile TV channel are reserved.

Figure 7:
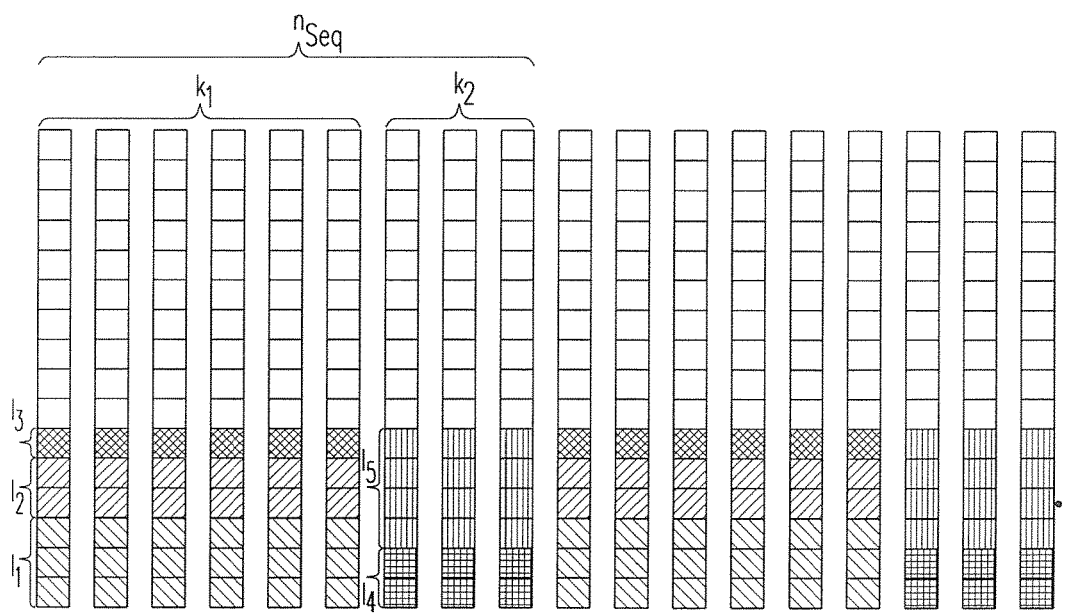
FIG. 7 shows an example time-dependency diagram of a data structure of a common datastream according to the first variant of the second embodiment of the present invention.

FIG. 7 shows a first variant of a second embodiment of the data structure for the common datastream. In each case, positions for data units from several datastreams of the mobile-digital television and of the common datastream for stationary-digital television are transmitted in combination in blocks of successive sequences. Here also, in every sequence of data units, for example, respectively 10 positions are provided for data units of stationary-digital television and respectively 6 positions for data units of mobile-digital television. In each case, $k_1=6$ sequences of data units for the common transmission of respectively $l_1=3$ data units of a first mobile TV channel, $l_2=2$ data units of a second mobile TV channel and $l_3=1$ data units of a third mobile TV channel per sequence of data units and respectively $k_2=3$ sequences of data units for the common transmission of respectively $l_4=2$ data units of a fourth mobile TV channel and $l_5=4$ data units of a first mobile TV channel per sequence of data units are reserved in every time interval.

Figure 8:
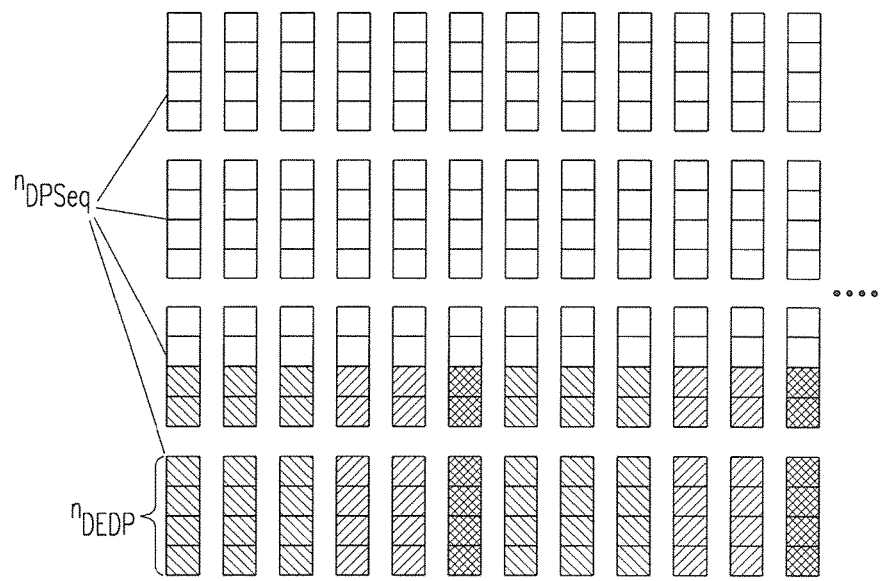
FIG. 8 shows an example time-dependency diagram of a data structure of a common datastream according to the second variant of the first embodiment of the present invention.
Figure 9:
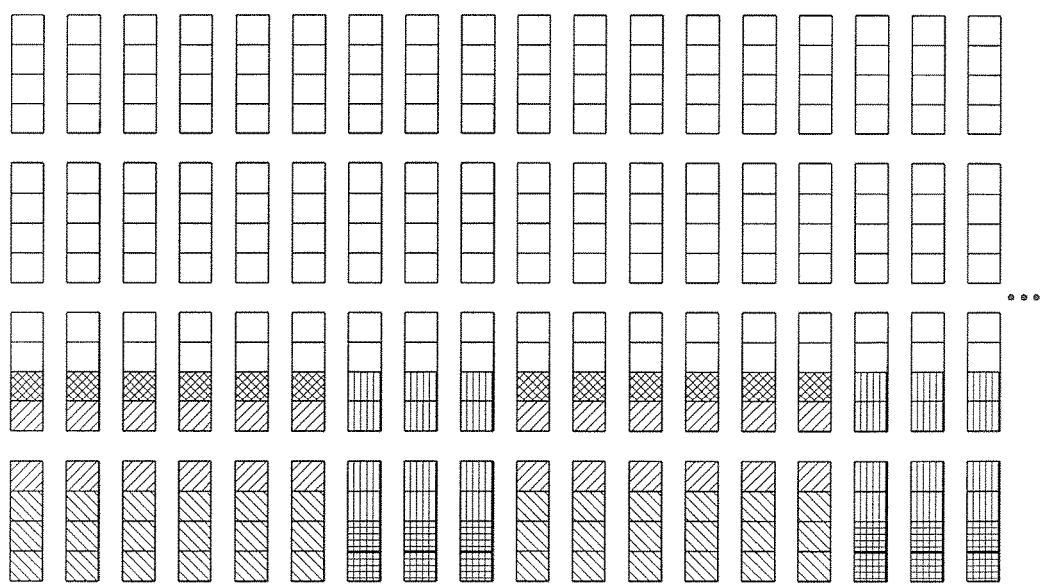
FIG. 9 shows an example time-dependency diagram of the data structure of a common datastream according to the second variant of the second embodiment of the present invention.

While, in the first variant of the first and second embodiment of the data structure for the common datastream in FIGS. 6 and 7, a data packet of data units extends respectively over the entire length of the sequence of data units, in FIG. 8, in a second variant of the first embodiment of the data structure for the common datastream, and in FIG. 9, in a second variant of the second embodiment of the data structure for the common datastream, every sequence consists of data units, for example, of $n_{DPSeq}=4$ data packets, which, once again, each contain $n_{DEDP}=4$ data units. In principle, other combinations of the number $n_{DPSeq}$ of data packets per sequence and of the number $n_{DEDP}$ of data units per data packet can be selected, which fulfill a predetermined number $n_{DESeq}$ of data units per sequence corresponding to equation (1).

$$n_{DESeq} = n_{DPSeq} \cdot n_{DEDP} \quad (1)$$

Figure 10A:
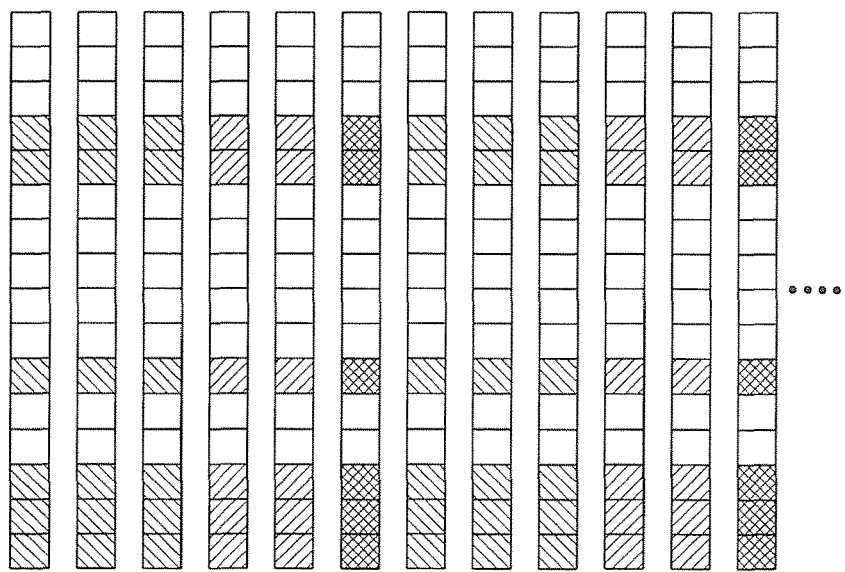
FIGS. 10A, 10B show an example time-dependency diagram of a modified data structure of a common datastream according to the first and second variant of the first embodiment of the present invention.
Figure 10B:
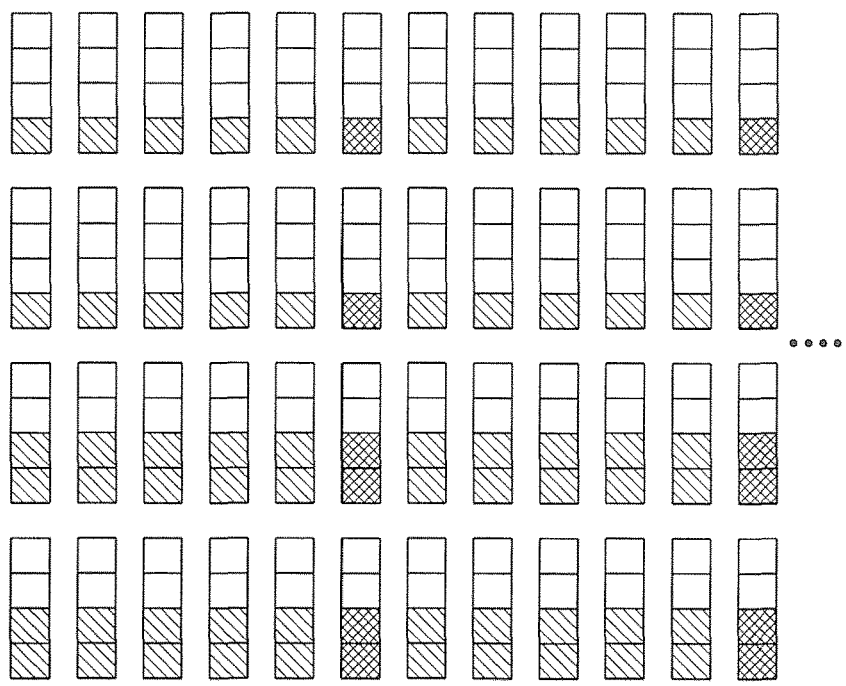

The successive arrangement of the positions for data units of mobile-digital television on one hand and for data units of stationary-digital television on the other hand—even across data-packet boundaries in the case of the second embodiment of the data structure—in FIGS. 6 to 9, is not compulsory. The arrangement can be modified, for example, by arranging the positions provided in every sequence for data units of the mobile-digital television intermittently relative to the positions provided in every sequence for data units of stationary-digital television. FIG. 10A illustrates a modification of the first variant of the first embodiment of the data structure of the common datastream $TS_{out}$ and FIG. 10B illustrates a modification of the second variant of the first embodiment of the data structure of the common datastream $TS_{out}$, in which the positions provided for the data units of the mobile-digital television are arranged intermittently relative to the positions provided for data units of the stationary-digital television—especially also across data-packet boundaries.

Figure 11:
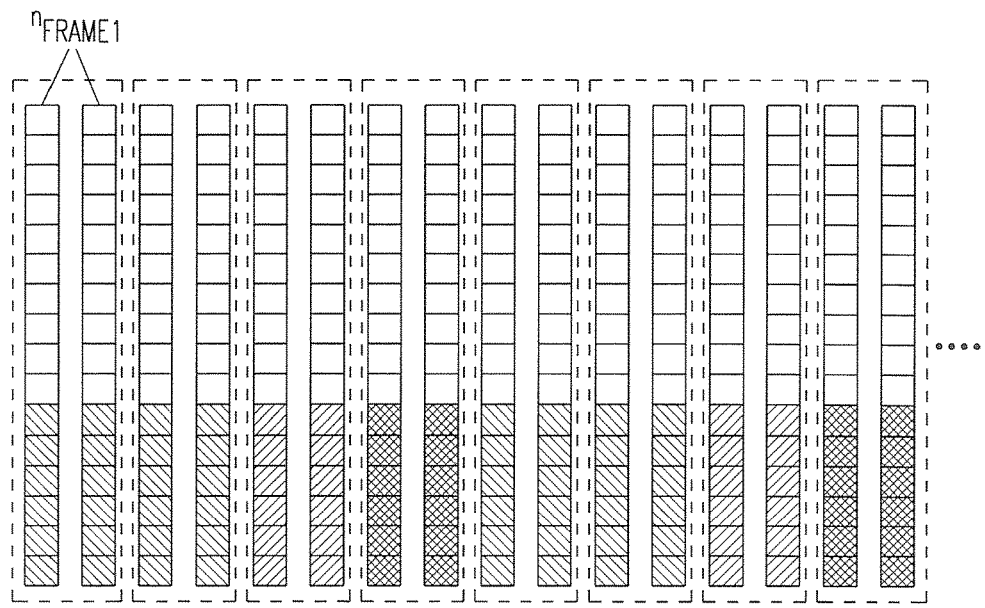
FIG. 11 shows an example time-dependency diagram of a data structure of a common datastream according to a first sub-variant of the first variant of the first embodiment of the present invention.

In FIG. 11, in a first sub-variant of the first variant of the first embodiment of the data structure for the common datastream $TS_{out}$, $n_{FRAME1}=2$ of successive sequences with data units from respectively one single datastream of the mobile-digital television are combined to form a first subordinate combination of data units "vertically-orientated combination of data units" indicated in FIG. 11 by broken lines. Furthermore, a first sub-variant of this kind can be developed in an analogous manner from the first variant of the first embodiment and from the second variant of the first and second embodiment of the data structure for the common datastream $TS_{out}$.

Figure 12:
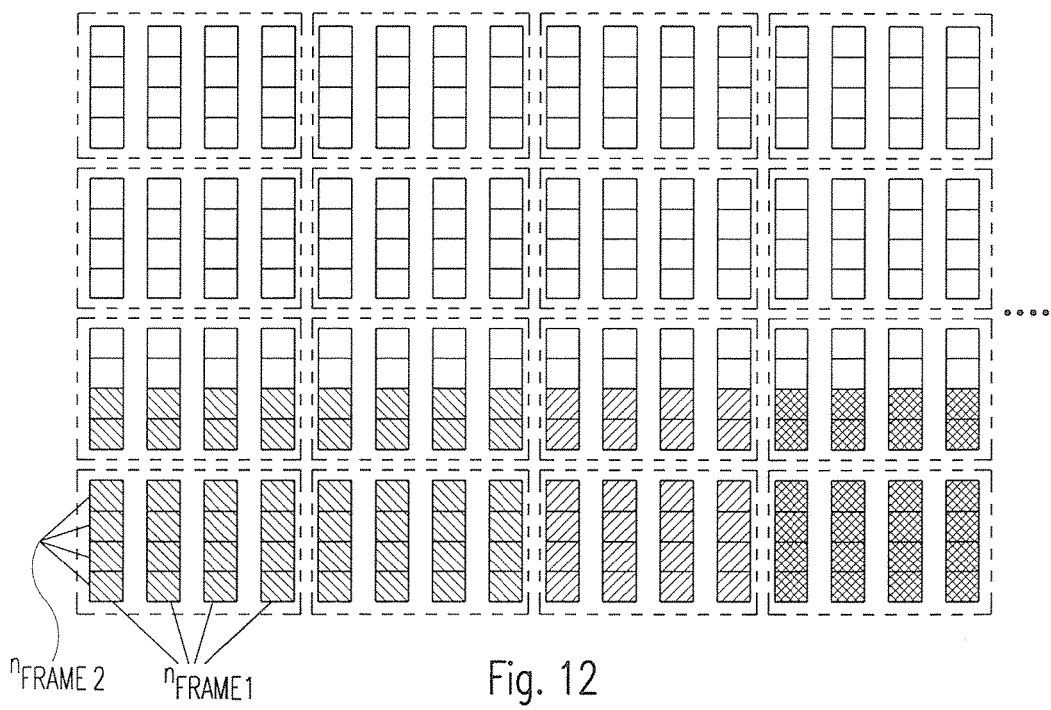
FIG. 12 shows an example time-dependency diagram of a data structure of a common datastream according to a second sub-variant of the second variant of the first embodiment of the present invention.

By analogy, in FIG. 12, in a second sub-variant of the second variant of the first embodiment of the data structure for the common datastream $TS_{out}$, $n_{FRAME2}=4$ successive data units per sequence of respectively $n_{FRAME1}=4$ successive sequences with data units from respectively one single datastream of the mobile-digital television are combined to form a second subordinate combination of data units "horizontally-orientated combination of data units"—indicated in FIG. 12 by broken lines. The number $n_{FRAME2}$ of data units per sequence, which are packed in a combination of data units, need not relate, as in FIG. 12, to the number $n_{DEDP}$ of data units per data packet and integer multiples thereof, but can assume any other arbitrary values smaller than the number $n_{DESeq}$ of data units per sequence. Accordingly, a second sub-variant of this kind can also be developed in an analogous manner from the first and second variant of the first embodiment and from the second variant of the second embodiment of the data structure for the common datastream $TS_{out}$.

The number $n_{FRAME1}$ of successive sequences and the number $n_{FRAME2}$ of successive data units respectively in one sequence for forming a combination of data units of the first and second sub-variant of the first or respectively second variant of the first or respectively second embodiment of the data structure for the common datastream $TS_{out}$ can assume any arbitrary meaningful values.

Additionally, several first and second subordinate combinations of data units of the first or of the second sub-variant of the first or respectively second variant of the first or respectively second embodiment of the data structure for the common datastream $TS_{out}$ can be combined to form respectively one superordinate combination of data units. The degree of combination of data units or respectively of combinations of data units can be realized with any required complexity.

FIG. 13A shows an exemplary data structure for the common datastream $TS_{out}$ according to the A-VSB standard. In this context, the data structure corresponds to the data structure on a hard disk. Data units (e.g., sectors) are combined to form data packets (e.g., TS packets) within a sequence of data units (e.g., track). One track is subdivided into several clusters consisting of at least one sector for the transmission of respectively one digital TV channel or digital service channel and consists, according to FIG. 13A, for example, of respectively 4 TS packets each with 4 sectors. The first cluster with 6 sectors is defined with data units for HDTV stationary-digital television, a second cluster with 3 sectors is defined with data units for SDTV—also stationary-digital television, a third cluster is defined with one sector for ESG data—electronic service/TV channel data—and finally, a fourth cluster with 5 sectors is defined with data units of several mobile-digital TV channels—Service 1 and 2.

Figure 13B:
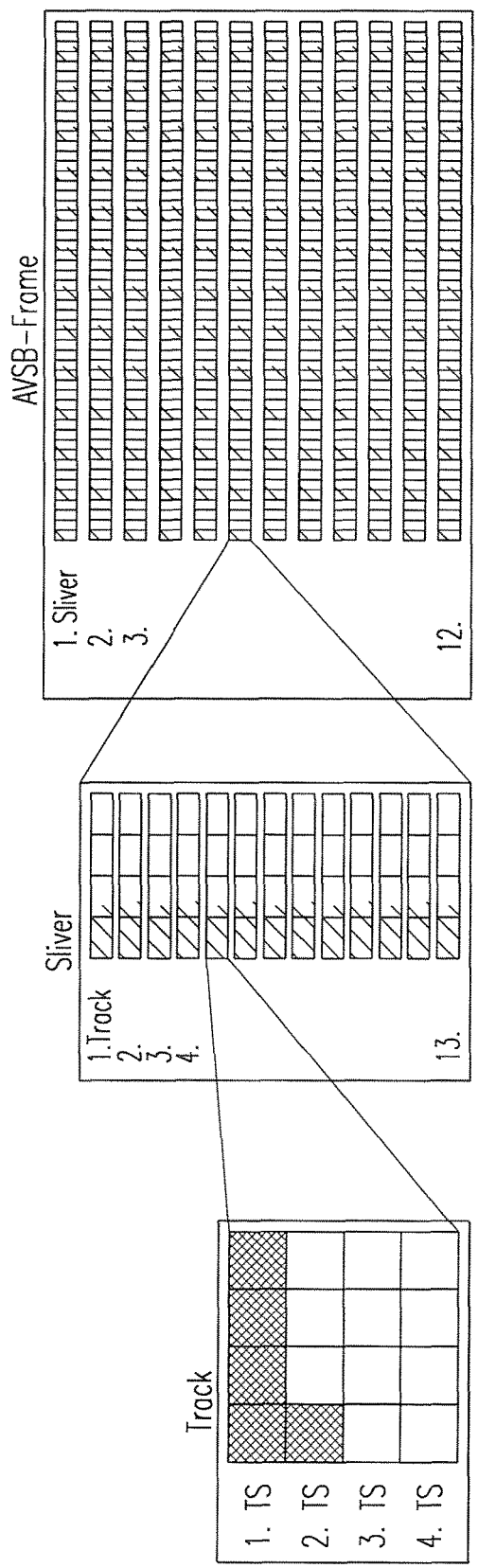

Corresponding to the first sub-variant of the second variant of the first embodiment of the data structure for the common datastream $TS_{out}$, according to FIG. 13B, 13 tracks are combined to form a sliver—equivalent to a first subordinate combination of data units. Following this, 12 slivers are bundled to form an AVSB frame—equivalent to a first superordinate combination of data units. Within each time interval of the cycle duration $\Delta T$, according to FIG. 13A, n-A-VSB frames are transmitted, wherein data units of service 1 are contained in the first A-VSB frames of a time interval and data units of service 2 are contained in the last A-VSB frames of a time interval.

According to FIG. 13A, information is stored about the beginning—number of the A-VSB frame, number of the cluster—in each case in the last A-VSB frame of the respective time interval associated with the respective service 1 or service 2, and about the data length of the data units of service 1 or service 2 in the next time interval.

Figure 14:
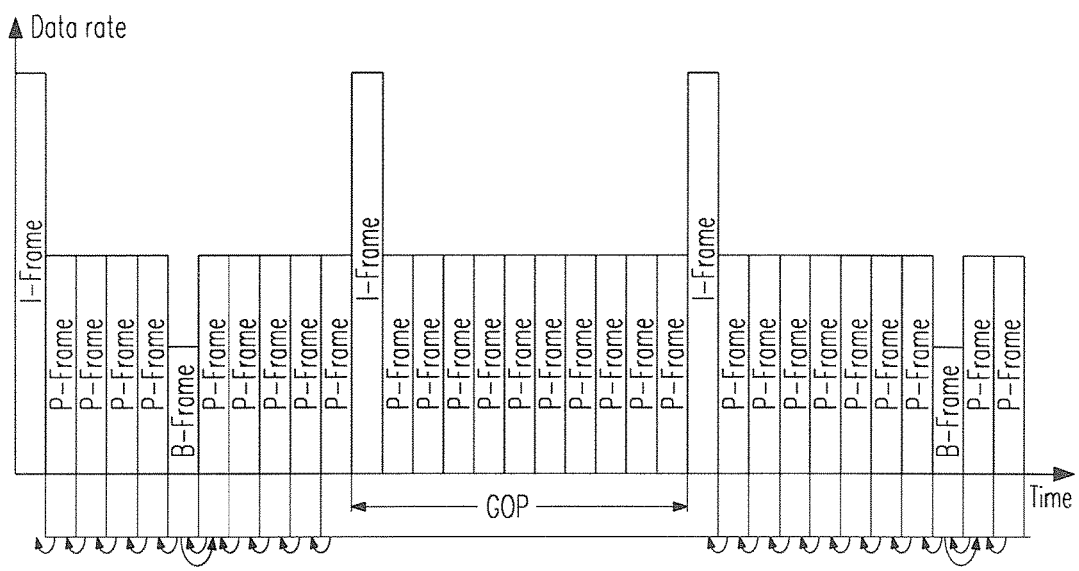
FIG. 14 shows an example time-dependency diagram of a GOP data structure for the transmission of video sequences.

The transmission of digital television data according to the MPEG-4-compression standard is implemented as shown in FIG. 14 in accordance with the Group of Pictures (GOP) structure, in which a fixed number of images per GOP is transmitted with a fixed structure of image types. At the beginning of each GOP, an intra-frame I-frame is transmitted, from the information of which an image can be completely reconstructed in the receiver. The intra-frame can be followed by one or typically more predictive-frames—P frames or bi-directional frames B-frames within a GOP. While P-frames contain variation information of the current image for the image of the last I-frame or P-frame, B-frames contain variation information of the current image for the last or the next I-frame or P-frame. Within the meaning of the GOP structure, one or more GOPs per digital TV channel can be packed in the common datastream $TS_{out}$ in every time interval. The data structure of the common datastream $TS_{out}$ must be designed in such a manner that in every case data units of an I-frame are transmitted in the first sequences of data units of every time interval, which is associated with the datastream of the respective stationary or mobile digital TV channel, and accordingly, at the beginning of a burst, a complete image of the respective digital TV channel can be reconstructed in the receiver.

Figure 5:
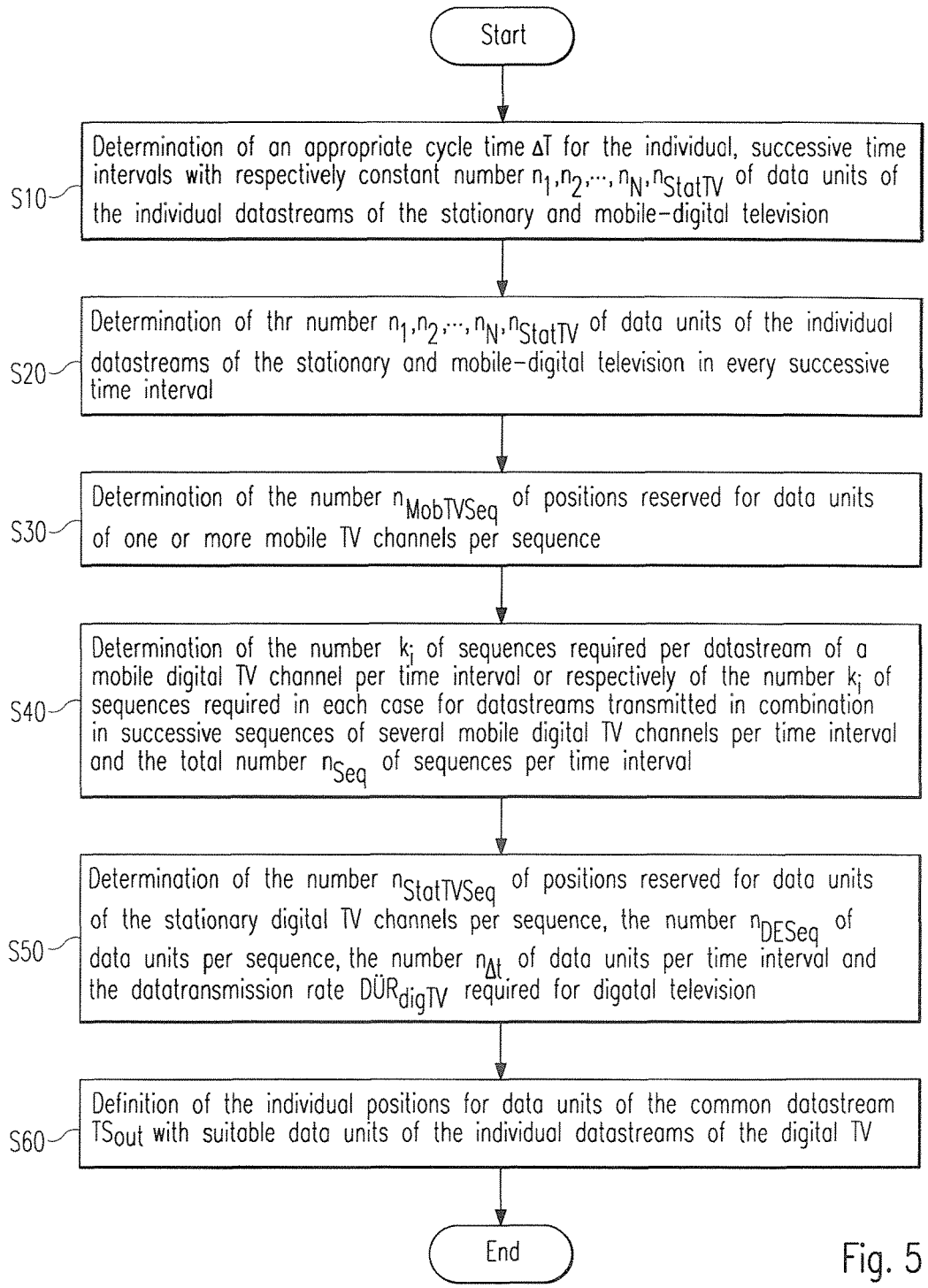
FIG. 5 shows an example flow chart of a process for forming a common datastream from several datastreams according to the ATSC standard and an embodiment of the present invention.

A process for forming a common datastream from several datastreams according to the ATSC standard will now be described with reference to the flow chart presented in FIG. 5.

In stage S10, the coding unit $7_1$ acting as the master unit interrogates the coding units $7_2, 7_3, \ldots, 7_N$ acting as slave units and the first multiplexer 2, regarding the respective demand for data-transmission capacity over a relatively long observation period and determines from the demands for data-transmission capacity obtained in this manner an appropriate cycle duration $\Delta T$ for the individual, successive time intervals, so that a consistent demand for transmission capacity for each individual datastream $6_1, 6_2, 6_3, \ldots, 6_N$ of the mobile-digital television and for the common datastream 5 of the stationary-digital television predominates within each individual time interval.

Next, in stage S20, the number $n_1, n_2, \ldots, n_N, n_{StatTV}$ of data units to be transmitted for every individual datastream $6_1, 6_2, 6_3, \ldots, 6_N$ of the mobile-digital television and for the common datastream 5 of the stationary-digital television occurring within a time interval with cycle duration $\Delta T$ is determined from the cycle duration $\Delta T$ determined in stage S10 for the individual successive time intervals and the demand for data-transmission capacity determined over a long observation period of each individual datastream $6_1, 6_2, 6_3, \ldots, 6_N$ and 5, wherein a data unit is a data volume with a previously-specified size—for example, several Kbytes of data.

Subsequently, in stage S30, a determination of the number $n_{MobTVSeq}$ of positions reserved for data units of one or more mobile TV channels in every sequence of data units is implemented on the basis of the number $n_1, n_2, \ldots, n_N, n_{StatTV}$ of data units to be transmitted as determined respectively in stage S20 for every individual datastream $6_1, 6_2, 6_3, \ldots, 6_N$ and 5.

This number $n_{MobTVSeq}$ of positions reserved for data units of one or more mobile TV channels in every sequence is obtained in the case of the first embodiment of the method according to the invention according to equation (2A) as the integer greatest common divisor $ggT\{\cdot\}$ of the required number $n_1, n_2, \ldots, n_N$ of data units to be transmitted per datastream of mobile-digital television. The integrality of the greatest common divisor $ggT\{\cdot\}$ can be achieved, for example, by rounding up one or more values of the determined numbers $n_1, n_2, \ldots, n_N, n_{StatTV}$ of data units to be transmitted per datastream and per time interval in each case to an appropriate higher value.

$$n_{MobTVSeq} = ggT\{n_1\ n_2 \ldots n_N\} \quad (2A)$$

In the case of the simultaneous transmission of data units of several datastreams of mobile-digital television in respectively-identical successive sequences of data units of the second embodiment of the method according to the invention, the number $n_{MobTVSeq}$ of positions reserved respectively for mobile TV channels in each sequence is obtained according to equation (2B) as the integer greatest common divisor $ggT\{\cdot\}$ of the summed numbers $$n_{Par1} = \sum_i n_i,\ n_{Par2} = \sum_j n_j,\ n_{Par3} = \sum_k n_k, \ldots$$

of data units per time interval of those mobile digital TV channels, which are transmitted in combination in respectively identical successive sequences.

$$n_{MobTVSeq} = ggT\{n_{Par1}\ n_{Par2}\ n_{Par3} \ldots\} \quad (2B)$$

In the subsequent stage S40, the number $k_i$ of sequences required for the case of the first embodiment of the method according to the invention for the transmission of data units of each individual datastream $6_1, 6_2, 6_3, \ldots, 6_N$ of mobile-digital television in every individual time interval is calculated according to equation (3A) as a division of the number $n_1, n_2, \ldots, n_N$ of data units of each datastream to be transmitted per time interval—optionally rounded up—by the number $n_{MobTVSeq}$ of positions reserved respectively for data units of one or more mobile TV channels in every sequence.

$$k_i = \frac{n_i}{n_{MobTVSeq}} \forall i = 1, 2, \ldots, N \quad (3A)$$

In the case of the simultaneous transmission of data units of several datastreams of mobile-digital television in respectively identical successive sequences of data units of the second embodiment of the method according to the invention, the number $k_i$ of sequences per time interval required for the summed number of data units of datastreams from digital TV channels transmitted in combination in respectively-identical successive sequences is obtained according to equation (3B) as the division of the summed—optionally rounded up—number $n_{Pari}$ of data units per time interval of those mobile digital TV channels, which are transmitted in combination in respectively identical successive sequences, by the number $n_{MobTVSeq}$ of positions reserved for data units of one or more mobile TV channels respectively in each sequence.

$$k_i = \frac{n_{Pari}}{n_{MobTVSeq}} \forall i = 1, 2, \ldots \quad (3B)$$

Finally, in stage S40, the number $n_{Seq}$ of sequences per time interval is calculated according to equation (4A) for the case of the first embodiment of the method according to the invention as the sum of the number $k_i$ of sequences required respectively for every time interval and for every datastream of a mobile digital TV channel, and according to equation (4B) for the case of the second embodiment of the method according to the invention as the sum of the number $k_i$ of sequences required respectively for datastreams of several mobile digital TV channels and for each time interval transmitted in combination in respectively-identical, successive sequences.

$$n_{Seq} = \sum_{i=1}^{N} k_i \quad (4A)$$

$$n_{Seq} = \sum_{i} k_i \forall i = 1, 2, \ldots \quad (4B)$$

In stage S50, the number $n_{StatTVSeq}$ of data units for stationary-digital television per sequence is determined according to equation (5) as the division of the number $n_{StatTV}$ of data units required per time interval for the transmission of the common datastream 5 of the stationary-digital television and of the number $n_{Seq}$ of sequences required per time interval.

$$n_{StatTVSeq} = \frac{n_{StatTV}}{n_{Seq}} \quad (5)$$

The determination of the number $n_{DESeq}$ of data units per sequence is therefore obtained according to equation (6) from the sum of the number $n_{StatTVSeq}$ of positions determined for data units of the stationary-digital television per sequence and the number $n_{MobTVSeq}$ of positions determined for data units of the mobile-digital television per sequence.

$$n_{DESeq} = n_{StatTVSeq} + n_{MobTVSeq} \quad (6)$$

The determination of the number $n_{\Delta t}$ of data units of digital television to be transmitted per time interval is therefore obtained from equation (7) from the number $n_{DESeq}$ of data units per sequence multiplied by the number $n_{Seq}$ of sequences per time interval, and the determination of the data-transmission rate $DÜR_{digTV}$ required for the transmission of the datastreams of stationary and mobile television follows according to equation (8) by dividing the number $n_{\Delta t}$ of data units to be transmitted per time interval by the cycle duration $\Delta t$ of the time interval.

$$n_{\Delta t} = n_{DESeq} \cdot n_{Seq} \quad (7)$$

$$DÜR_{digTV} = \frac{n_{\Delta t}}{\Delta t} \quad (8)$$

In the final stage S60, with the parameters of the data structure of the common datastream $TS_{out}$ determined in this manner, the common datastream $TS_{out}$ is combined in the Medium Access Control layer of the transmitter in every successive time interval at the respective positions for data units with the respectively-matching data units of the individual datastreams of mobile-digital television and of the common datastream of stationary-digital television.

Since the data units of the individual datastreams are transmitted corresponding to the data structure of the common datastream $TS_{out}$ only in given sequences and therefore in given time slots, the data-transmission rate in these time slots—during the individual bursts—must be higher than the data-transmission rate of the respective datastream generated continuously at the output of the respective coding unit, as shown in FIG. 4. In order to avoid the risk of data interruptions in the time slots between the individual bursts, the coded data generated by the individual coding units should be buffered in the second multiplexer 8.

The invention is not restricted to the embodiments, variants and sub-variants of methods and devices described herein for forming a common datastream from several datastreams according to the ATSC standard. In particular, data-packet-orientated data structures of digital television and other digital transmission applications introduced in future, which do not correspond to the ATSC standard, are covered by the invention.

The specification and drawings are accordingly to be regarded in an illustrative rather than in a restrictive sense. It will, however, be evident that various modifications and changes may be made thereto, in a computer program product or software, hardware or any combination thereof, without departing from the broader spirit and scope of the present invention.

Software embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A non-transitory machine readable medium having stored thereon instructions that when executed by a device cause the device to perform operations comprising:
   generating, by at least one stationary-digital television coding unit at least one stationary-digital television signal datastream from respective stationary-digital television channels;
   generating, by at least one mobile-digital television coding unit a plurality of mobile-digital television signal datastreams from respective mobile-digital television channels;
   generating, by a first multiplexer a common stationary-digital television signal datastream from the at least one stationary-digital television signal datastream;
   determining, by a mobile-digital television coding unit acting as a master:
      for each of the plurality of mobile-digital television signal datastreams, a first respective number of data units, the first respective number of data units being constant across each successive time interval, and each successive time interval including a plurality of sequences and having a constant cycle duration;
      for the common stationary-digital television signal datastream, a second number of data units, the second number of data units being constant across each successive time interval;
      a number of first positions for data units of the plurality of mobile-digital television signal datastreams for each of the plurality of sequences by computing a greatest common divisor for the first respective numbers of data units, the number of first positions being constant across each of the plurality of sequences;
      a number of second positions for data units of the common stationary-digital television signal datastream for each of the plurality of sequences by dividing the second number of data units by the greatest common divisor, the number of second positions being constant across each of the plurality of sequences;
      a data structure for a common transport datastream arranged to contain the plurality of sequences, each of the plurality of sequences including the number of first positions and the number of second positions;
   arranging the first positions successively in each of the plurality of sequences and identically across each successive time interval; and
   arranging the second positions successively in each of the plurality of sequences and identically across each successive time interval; and
   packing, by a second multiplexer of the device, the first positions of the data structure of the common transport datastream with the data units of the plurality of mobile-digital television signal datastreams and the second positions with the data units of the common stationary-digital television signal datastream.

2. The non-transitory machine readable medium according to claim 1, further having stored thereon instructions that when executed by the device cause the device to perform an operation comprising:
   transmitting the first respective number of data units for each one of the plurality of the mobile-digital television signal datastreams in a predetermined number of the plurality of sequences, wherein the predetermined number of the plurality of sequences are transmitted successively.

3. The non-transitory machine readable medium according to claim 1, further having stored thereon instructions that when executed by the device cause the device to perform an operation comprising:
   obtaining the plurality of sequences within each successive time interval by summing a number of successive ones of the plurality of sequences determined respectively for each mobile-digital television signal datastream.

4. The non-transitory machine readable medium according to claim 1, further having stored thereon instructions that when executed by the device cause the device to perform an operation comprising:
   combining, in each case, a constant number of the plurality of sequences with data units of a single mobile-digital television signal datastream to form a first subordinate combination of data units.

5. The non-transitory machine readable medium according to claim 4, further having stored thereon instructions that when executed by the device cause the device to perform an operation comprising:

combining, in each case a constant number of data units, which are stored in respectively identical positions for data units of at least one of the stationary-digital television signal datastream and the plurality of mobile-digital television signal datastreams successively within a sequence of data units and in successive sequences of data units, to form a second subordinate combination of data units.

6. The non-transitory machine readable medium according to claim 5, further having stored thereon instructions that when executed by the device cause the device to perform an operation comprising:

combining, a plurality of first or second subordinate combinations of data units in each case to form a first or a second superordinate combination of data units.

7. A device for forming a common transport datastream from a plurality of mobile-digital television signal datastream and from a common stationary-digital television signal datastream, the device comprising:

at least one stationary-digital television coding unit configured to generate at least one stationary-digital television signal datastream from respective stationary-digital television channels;

at least one mobile-digital television coding unit configured to generate the plurality of mobile-digital television signal datastreams from respective mobile-digital television channels;

a first multiplexer configured to generate the common stationary-digital television signal datastream from the at least one stationary-digital television signal datastream; and a second multiplexer in communication with the first multiplexer and the at least one stationary-digital television coding unit and the at least one mobile-digital television coding unit and configured to generate the common transport datastream from the plurality of mobile-digital television signal datastreams and the common stationary-digital television signal datastream, wherein one of the at least one mobile-digital television coding unit operates as a master and is connected to the other at least one mobile-digital television coder operating as a subordinate slave, and the master is configured to:

determine, for each of the plurality of mobile-digital television signal datastreams, a first respective number of data units, the first respective number of data units being constant across each successive time interval, and each successive time interval including a plurality of sequences and having a constant cycle duration;

determine, for the common stationary-digital television signal datastream, a second number of data units, the second number of data units being constant across each successive time interval;

determine a number of first positions for data units of the plurality of mobile-digital television signal datastreams for each of the plurality of sequences by computing a greatest common divisor for the first respective numbers of data units, the number of first positions being constant across each of the plurality of sequences;

determine a number of second positions for data units of the common stationary-digital television signal datastream for each of the plurality of sequences by dividing the second number of data units by the greatest common divisor, the number of second positions being constant across each of the plurality of sequences;

form a data structure for the common transport datastream arranged to contain the plurality of sequences, each of the plurality of sequences including the number of first positions and the number of second positions;

arrange the first positions successively in each of the plurality of sequences and identically across each successive time interval; and arrange the second positions successively in each of the plurality of sequences and identically across each successive time interval; and the second multiplexer further configured to pack the first positions of the data structure of the common transport datastream with the data units of the plurality of mobile-digital television signal datastreams and the second positions with the data units of the common stationary-digital television signal datastream.

8. The device for forming a common transport datastream according to claim 7, wherein the second multiplexer is configured to transmit the first respective number of data units for each one of the plurality of the mobile-digital television signal datastreams in a predetermined number of the plurality of sequences, wherein the predetermined number of the plurality of sequences are transmitted successively.

9. The device for forming a common transport datastream according to claim 7, wherein the master is further configured to obtain the plurality of sequences within each successive time interval by summing a number of successive ones of the plurality of sequences determined respectively for each mobile-digital television signal datastream.

10. The device for forming a common transport datastream according to claim 7, wherein the master further configured to combine, in each case, a constant number of the plurality of sequences with data units of a single mobile-digital television signal datastream to form a first subordinate combination of data units.

11. The device for forming a common transport datastream according to claim 10, wherein the master is further configured to combine, in each case, a constant number of data units, which are stored in respectively identical positions for data units of at least one of the stationary-digital television signal datastream and the plurality of mobile-digital television signal datastreams successively within a sequence of data units and in successive sequences of data units, to form a second subordinate combination of data units.

12. The device for forming a common transport datastream according to claim 11, wherein the master is further configured to combine a plurality of first or second subordinate combinations of data units in each case to form a first or a second superordinate combination of data units.

* * * * *